March 9, 1971  J. A. THIES  3,568,422
NUT HARVESTER

Filed July 24, 1968  2 Sheets-Sheet 1

INVENTOR.
JOHN A. THIES
BY
ATTORNEY

March 9, 1971    J. A. THIES    3,568,422
NUT HARVESTER

Filed July 24, 1968    2 Sheets-Sheet 2

INVENTOR.
JOHN A. THIES
BY
ATTORNEY

United States Patent Office 3,568,422
Patented Mar. 9, 1971

3,568,422
NUT HARVESTER
John A. Thies, Newton, N.C.
(675 Merritt Drive, Mobile, Ala. 36609)
Filed July 24, 1968, Ser. No. 747,236
Int. Cl. A01d 51/00
U.S. Cl. 56—328    7 Claims

ABSTRACT OF THE DISCLOSURE

Gathers nuts or the like which are on the surface of the ground, by vacuum action, picks up the nuts along with some debris or other material and separates the nuts from the debris along a relatively short interval flow stream by the combined action of a serpentine flow stream, gravity, inertia and deflector fingers.

---

This invention relates to machines which harvest or gather nuts or other like particles which have accumulated or have been deposited on the surface of the ground. Prior art machines have been devised to pick up nuts from the ground along with a certain amount of loose leaves and other material which would be sucked up with them and pass the mixture into a chamber in which the nuts would be pulled down entirely by gravity. To accomplish separation by gravity alone required a large chamber to permit the nuts to fall out. In this arrangement, a great deal of the heavier debris fell down with the nuts and had to be separated later. The prior art also sets forth other bulky equipment with more complicated methods of separation.

It is the object of the present invention to provide for a serpentine flow stream through the body of a harvester arranged to accomplish separation by a change in direction of the flow stream bringing into play the inertia of the moving nuts, aided by gravity, and aided at times by mechanical means.

Another object is to provide for directing the separated nuts or other harvested objects into a temporary accumulator which may be emptied from time to time.

Another object is to keep the debris in the airstream and pass it out with the discharged air.

Another object is to provide an intake guard which will tend to hold out debris from the intake and keep it on the ground as the harvester passes over.

Still another object is to utilize a guard to prevent the nozzle from coming too close to or in contact with the ground as the harvester travels over an uneven surface.

Yet another object is to provide a type of guard to move along the surface of the ground which will tend to move the nuts from their settled position thereby making them easier to be sucked up into the nozzle.

A still further object is to embody these functions in a comparatively small, easily manufactured and inexpensive machine.

These and other objects will be apparent from the following description and drawings, in which.

Figure 1:
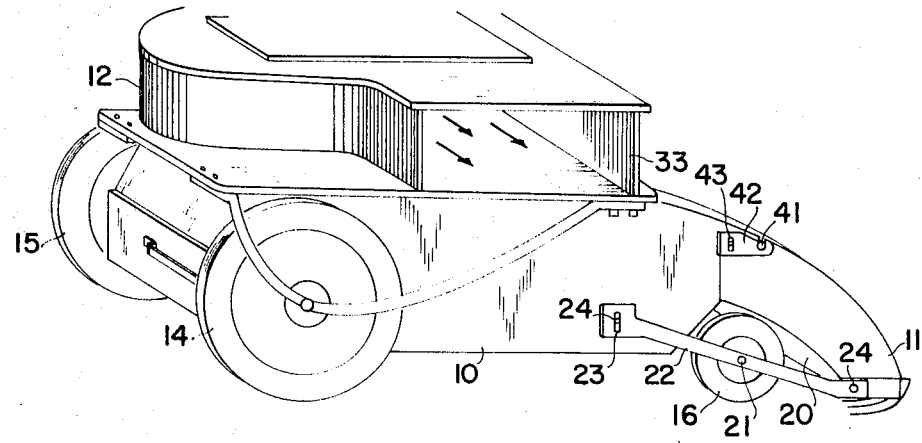
FIG. 1 is an oblique elevation of the harvester.
Figure 2:
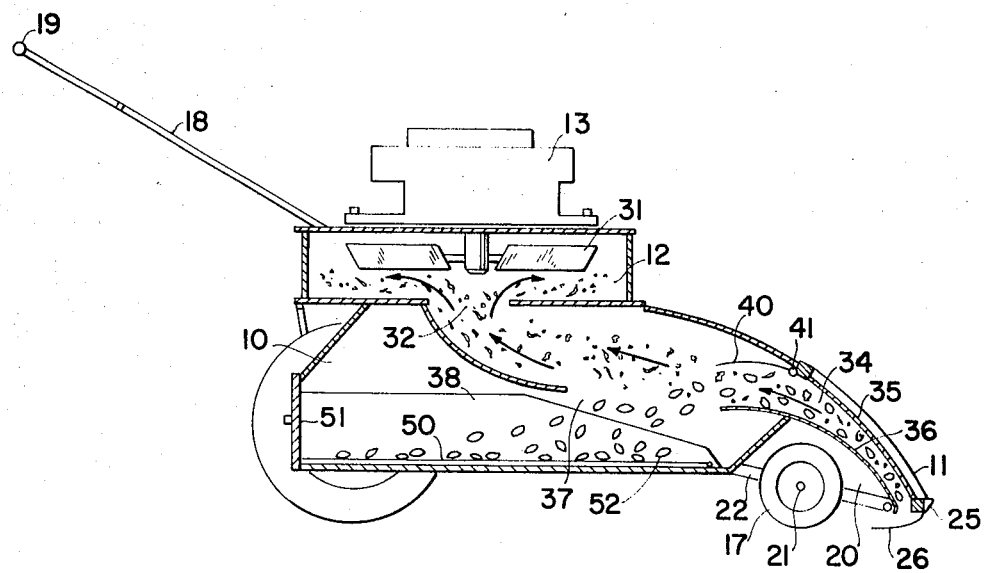
FIG. 2 is a vertical sectional view taken along a central plane extending from front to rear.

Referring now to FIGS. 1 and 2, it will be seen that the harvester in a small size may be considered to somewhat resemble a lawn mower. It comprises a body 10 and a forwardly extending pickup or suction nozzle 11, a fan chamber 12 and a motor 13 for driving the fan. The structure travels on rear transport wheels 14 and 15 and adjustable front transport and nozzle clearance guage wheels 16 and 17. Guidance and control may be effected by handle beam 18 and handles 19 equipped with controls of the type customarily provided on lawn mowers.

The body 10 and the nozzle 11 are joined on the ground side over an arch space 20 providing room in which adjustably mounted guage wheels 16 and 17 are disposed. The clearance wheels are carried on a common shaft 21 secured and supported on a pair of bars 22, one at each end, which span the space 20. These bars are joined to the body 10 through a vertical adjustment slot 23 at one end and a pivot at the other to position wheels 16 and 17 for the desired ground clearance of nozzle 11. Fasteners 24 operate to hold the bars in adjusted position. Other means for setting and holding the clearance wheels will be apparent to those skilled in the art. The running height of the nozzle 11 above the ground will be determined by the amount the clearance wheels 16 and 17 are set to extend below the level of the nozzle as they contact the ground.

The rear wheels 14 and 15 are set in position to carry the greater portion of the weight of the machine. Only enough weight need be at the front to keep nozzle guage wheels in light contact with the ground. The main support wheels 14 and 15 are relatively large with substantial sized tires to make for easier rolling with load.

Figure 4:
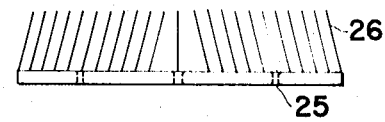
FIG. 4 is a plan view of the nozzle guard alone.
Figure 5:
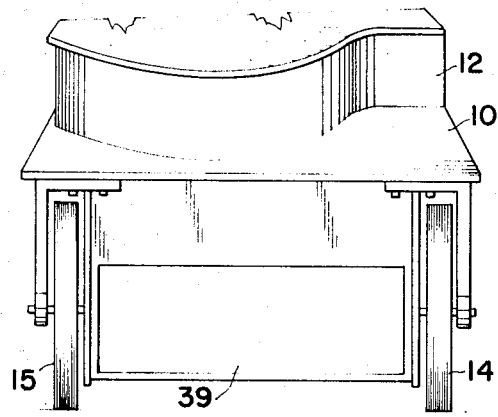
FIG. 5 is a partial rear view.
Figure 6:
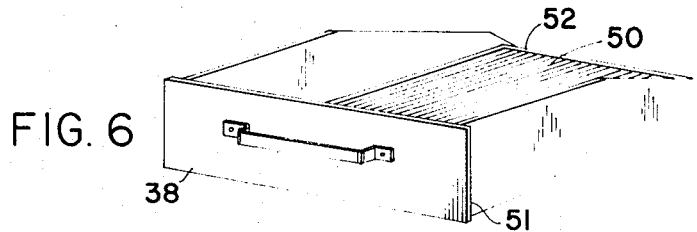
FIG. 6 is an oblique view of the accumulator tray.

An optional feature of my invention is shown best in plan view FIG. 4. It is shown in place in FIG. 2 also partially in views 1 and 3. It might be termed a nozzle guard. It comprises a bar 25 mounted at the front of nozzle 11 carrying a series of finger rods 26 formed to extend below the mouth of nozzle 11 and move along substantially in contact with the ground. Although the finger rods 26 may extend rearwardly at right angles to the bar 25, in its preferred form they are inclined inwardly slightly as shown. Arranged in this manner the finger rods will tend to move the nuts out of their settled position enabling them to be more readily sucked into the nozzle 11. The guard also serves to restrain the nozzle from coming into contact with the ground when traversing an uneven surface. In addition the fingers tend to hold down some of the trash and debris that might otherwise be sucked up with the nuts. The bar 25 carrying the finger rods 26 is mounted at the front of nozzle 11 with removable fasteners 27. This will enable the guard fingers to be removed when desired.

Figure 3:
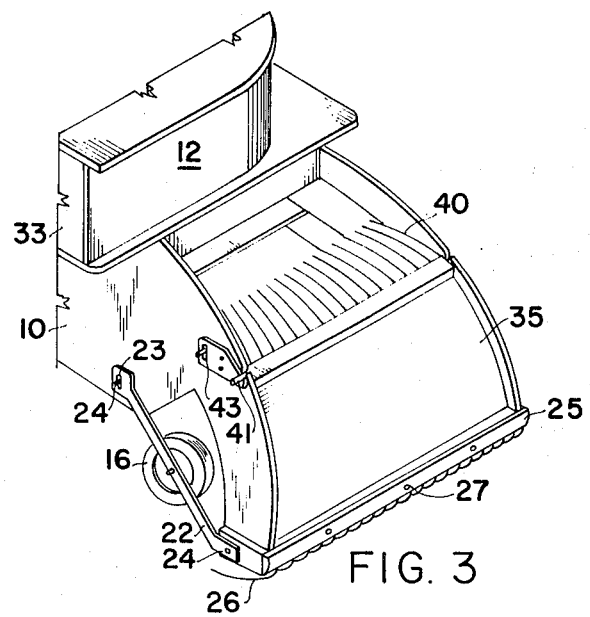
FIG. 3 is a partial front view showing the general narrowing width of the air flow chamber as it rises.

The interior of the machine is best shown in FIGS. 2 and 3. Suction is created by operating motor or engine 13 to rotate a fan blade 31 in housing 12.

The housing has in the lower side or bottom an intake opening 32 at the center and discharge opening 33 out through the vertical side shown in FIG. 1. The relation between the size of the fan chamber is such that relatively enough clearance is provided to permit a considerable amount of debris to pass through without obstructing or interfering with the fan.

In a very practical form motor 13 will be a throttle controlled gasoline engine. The speed of this type engine may be easily regulated and controlled to get and maintain the suction required to properly pick up the nuts. With the fan 31 in operation and the nozzle 11 having been set at suitable distance above the ground air is sucked up through the nozzle in the form of a stream generally and with it the nuts lying on the ground and such debris as may pass through the nozzle slot. The amount of suction desired will vary with conditions and the type of nuts being harvested. The suction is regulated by the height of the nozzle above the ground and the speed of the fan.

The air goes up as a stream carrying the material picked up along with it. The stream is guided between curved surfaces 35 and 36 which form a passageway leading up from the elongated inlet opening of nozzle 11. The stream turns downwardly toward the horizontal in the first part of the passageway. Approximately one-third to one-half way up the passageway the shape of the housing causes the airstream to begin to change its direction to an upward curving one. As the airstream progresses, the leaves and other light weight debris will follow the airstream in its curving path. But the nuts being heavier material will tend to be pulled down out of the stream by gravity as it changes direction upward and carried forward by inertia causing them to be directed downward out of the airstream.

The surface 36 is discontinued for a distance to form a gap or opening 37 through which the nuts can pass as they leave the airstream. Underneath the opening 37 is a tray 38 into which the nuts fall as they are carried forward by inertia. The tray is inserted into the housing 10 through opening 39 fitted rather closely to block the entrance of air. To aid in more positively separating the nuts from the airstream 34 curved fingers 40 are arranged to project from a bar 41 and set out into the airstream, aimed to more definitely project the nuts through the gap 37 and into nut accumulator tray 38. The function of the fingers is to act with the aid of gravity and inertia to accomplish a more definite separation of nuts from debris from the airstream and cause them to plunge into the tray. Thus it is seen that the action of the fingers is combined with two other forces to accomplish separation.

The fingers 40 are spaced as wide as possible to permit the passage of debris but at the same time deflect the nuts. This spacing may be different for different sized nuts harvested. It may be desirable to design several finger-bars each with finger spacing most suitable for specific sized nuts with provision for interchanging them on the harvester.

The finger-bar 41 is arranged to pivot and be set in a range of positions by means of the segment 42 having a slot 43 on the protruding end of the bar with means to secure the bar in adjusted position. For heavy weight nuts the fingers may be set in a relatively high position. For light weight nuts the position of the fingers may be set lower to more effectively direct the nuts into the tray.

The fingers 40 preferably reach only far enough across the airstream to properly direct the nuts and at the same time permit large particles of debris that do not pass between the fingers to slide off the ends of them and continue with the airstream.

The preferred form of tray 38 is of special design. It is constructed of lateral bars 50 secured at opposite ends in headers 51 and 52. The spacing of the bars is chosen to retain the nuts and let the small heavy trash and debris such as sand that might pass down with the nuts to sift through to the bottom of the tray compartment. Bars have been found to let more trash material through resulting in a cleaner nut accumulation in the tray.

As the accumulator tray becomes loaded with nuts it may be removed and emptied into a large compartment or storage bin.

It should be pointed out that although my invention is shown in its most simple and elementary form as a small push type machine, it is within the contemplation of this inventor that the machine of this type may be built as self propelled models in which the operator walks or as tractor rider units or in a diversity of other types as the demand may dictate.

In operation the unit is placed in a groove or other groups of nut bearing trees which drop their nuts at maturity and set in motion with the motor in operation adjusted to produce a suction suitable to pick up the nuts from the ground and ingest them floating into the suction airstream. As the machine begins to travel forward, need for adjustments such as nozzle clearance, fan speed and deflecting fingers can be easily and quickly detected and made.

The separation takes place, as already described, along the airstream leading from the nozzle to the fan chamber.

The setting of the separating fingers 40 plays a very important part in the separation process. Their setting is adjusted downwardly into the airstream just enough to definitely direct the nuts aided by gravity and momentum to go back and drop into the accumulator tray. All this is accomplished with a minimum of mechanism and within a minimum of space.

The nozzle guard 25 with finger 26 is a supplemental element which is not a required part of the harvester but performs a very useful function when employed. First it prevents the nozzle from scraping against the ground when used over uneven ground surface. It will first contact the ground and may even carry the weight of the front of the machine sufficiently to keep the nozzle always off the ground surface. Secondly, the fingers of the guard extending back at an angle will tend to disturb the nuts from their settled position and render them more easily sucked up. Thirdly, the guard fingers will hold down much trash and debris that would otherwise be picked up. As a matter of fact the nozzle guard makes it possible to adjust the nozzle closer to the guard and do a more effective pick-up job than without the guard.

There are many fine points of adjustment and operation which will be apparent to those skilled in the art. Other embodiments of my invention will be apparent which will not be a departure from the spirit of the invention and remaining within the original concept.

What I claim is:

1. A nut gathering device, propelled by hand or other suitable means, comprising a body, spaced rear wheels supporting said body, a fan housing having a suction opening and a discharge opening mounted on said body, a suction fan mounted within said housing, a motor connected to said fan, a suction nozzle on the front of said body with an elongated opening disposed transversely thereof and adjacent to the surface which is supporting the body, front wheels adjacent to said nozzle and being adjustably mounted on said body, a portion of said body being arranged to form a serpentine housing or duct structure enclosing a passageway connecting said suction nozzle to the suction opening of the fan chamber, an initial portion of said duct structure having a downward curvature toward the horizontal, a further and terminal portion of said duct structure having a reverse curvature and extending to said suction opening of said fan chamber housing, an opening or gap provided in the lower wall of said duct structure approximately midway thereof to permit nuts and other heavy material such as nuts or the like entrained in the airstream to plunge down out of the airstream, and means associated with said housing and duct structure to receive the heavy material plunging down through said opening in said duct structure while the lighter air entrained material continues through said passageway and said fan housing and the discharge opening therein to the outside.

2. A device according to claim 1 in which fingers are set in the airstream flowing along the passageway in position to aid gravity in deflecting the nuts or the like down out of the airstream.

3. A device according to claim 2 in which means is provided for varying the position of the fingers in the airstream to modify their aid to gravity in deflecting the nuts down through the gap.

4. A device according to claim 1 in which the means for receiving the nuts or the like is a removable accumulator tray below the gap in the housing passageway positioned to receive the material plunging out of the airstream.

5. A device according to claim 4 in which the tray is constructed with a slat bottom to permit sand or the like which might come down with the nuts to sift through to the bottom of the compartment.

6. A device according to claim 1 in which guard fingers suitably spaced for nuts to be sucked through, are secured below the mouth of the suction nozzle disposed substantially in contact with the debris and the nuts on the ground over which the machine passes to hold back some of the debris, but not the nuts, that might be sucked up, and at the same time restrain the nozzle from coming into contact with the ground as it passes over an uneven surface.

7. A device according to claim 6 in which the guard fingers are inclined transversely away from the horizontal path of travel to contact and disturb the nuts from their settled positions and cause them to be more easily sucked into the nozzle.

References Cited
UNITED STATES PATENTS

| | | | |
|---|---|---|---|
| 2,064,587 | 12/1936 | Carlstedt | 15—347X |
| 2,502,810 | 4/1950 | Waters | 56—328 |
| 2,593,625 | 4/1952 | Stokes | 56—328 |
| 2,699,637 | 1/1955 | Nisbet | 56—30 |
| 2,781,625 | 2/1957 | Phelps et al. | 56—328 |
| 2,807,128 | 9/1957 | Helfrich | 56—328 |
| 2,978,859 | 4/1961 | Tubbs | 56—328 |
| 3,089,178 | 5/1963 | Sherman, Jr. | 15—347 |
| 3,352,094 | 11/1967 | Lemaire | 56—328 |

RUSSELL R. KINSEY, Primary Examiner